Oct. 17, 1961 KIHEIDA TAJIMA ET AL 3,005,054

TELEPHONE SYSTEM

Filed Dec. 21, 1954 2 Sheets-Sheet 1

United States Patent Office
3,005,054
Patented Oct. 17, 1961

3,005,054

TELEPHONE SYSTEM

Kiheida Tajima, Goro Emori, and Eijiro Otsuka, % Totsuka Works of Hitachi Limited, 216 Totsuka-machi, Totsuka-ku, Yokohama, Japan, and Hisao Futaki, % Central Research Laboratory of Hitachi Limited, 280 aza Hanezawa, Oaza Koigakubo, Kokubunji-machi, Tokyo, Japan Filed Dec. 21, 1954, Ser. No. 476,794
Claims priority application Japan Mar. 27, 1954
3 Claims. (Cl. 179—32)

This invention relates to arrangements for assuring privacy in multi-party telephone systems.

To achieve this result, the invention contemplates the provision of a thermal variable resistance connected in series with the telephone set or transmitter of each subscriber of a multi-party telephone system such that the characteristics of said variable resistance can be used to prevent other subscribers from overhearing or disturbing a conversation.

Figure 1:
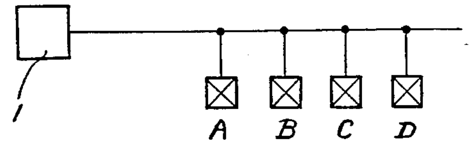
Figure 2:
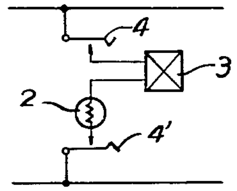
Figure 3:
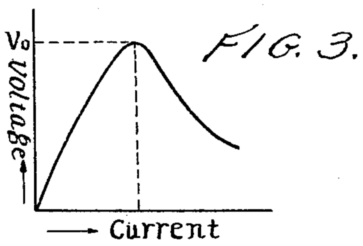
Figure 4:
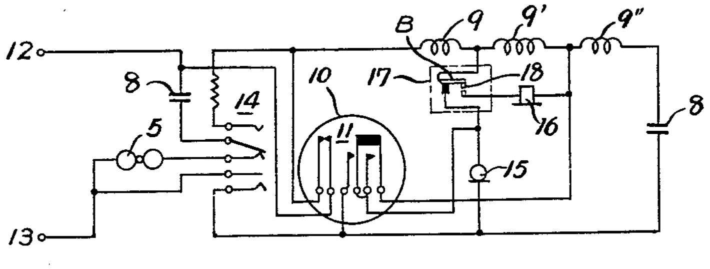
Figure 5:
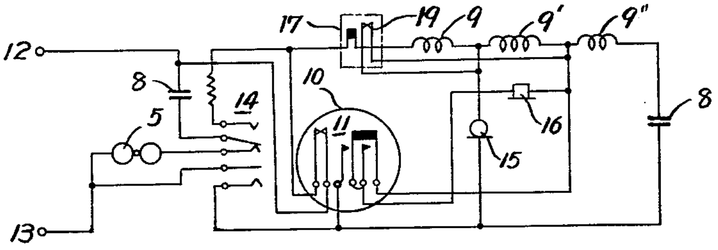

For a better understanding of invention reference is next made to the accompanying drawing, in which:

FIG. 1 is a simplified block diagram of a telephone system for multi-party subscribers, FIG. 2 is a schematic diagram illustrating the principle of this invention, FIG. 3 is a voltage-current characteristic curves of a thermal variable resistance employed in accordance with the invention, FIG. 4 is a schematic diagram of a telephone circuit according to a preferred embodiment of this invention, and FIG. 5 is a schematic diagram similar to FIG. 4 showing a modified embodiment of this invention.

In FIG. 1, 1 designates a central telephone exchange office, A, B, C, D designate party subscribers in a common circuit.

In such telephone systems for multi-party subscribers, it has heretofore been found that when a subscriber, for instance, A, is talking by telephone, his conversation might be objectionably monitored.

FIG. 2 is a diagrammatic representation of an arrangement for a party subscriber, wherein 2 represents a thermal variable resistance, 3 a telephone set or telephone transmitter, and 4, 4' represent hook switches. According to this invention, a thermal variable resistance 2 is connected in series to the telephone set or transmitter 3 of each party subscriber in the multi-party telephone system in such manner that if one of the party subscribers takes up the receiver when the multi-party line is not being used, the hooks 4 and 4' make contact to impress a voltage E from the source of the telephone exchange office (not shown) on the thermal variable resistance 2, thereby considerably reducing its resistance so as to permit use of the associated telephone. If the multi-party line is being used by one of the party subscribers, the voltage E from the central exchange office is shunted by the telephone set of the party subscriber who is using the telephone such that if another party subscriber tries to use his telephone the thermal variable resistance of the latter subscriber receives only a fraction V of the voltage E.

The peak voltage $V_0$ of the voltage-current characteristic curve of the thermal variable resistance 2, as shown in FIG. 3, is previously chosen, according to this invention, to be higher than the fractional impressed voltage V so that the amount of resistance of the thermal variable resistance 2 does not decrease substantially. The telephone set or telephone transmitter connected in series with the latter thermal variable resistance 2 cannot operate with a small current passing therethrough, and accordingly the party subscribers subsequent to the first cannot effectively use the multi-party line and monitor the talking of the first user. The voltage E from the office should of course be higher than the peak voltage $V_0$ of the voltage-current characteristics of the thermal variable resistance 2.

The invention involves further improvements providing a bimetal contact operating with a temperature rise of thermistor beads in the transmitter circuit of the telephone set of each subscriber in multi-party telephone system.

A preferred embodiment of this invention for carrying out the above system is shown in FIGS. 4 and 5, wherein 14 designates the hook switch of a telephone transmitter 15 and receiver 16 respectively, 17 a thermistor bead, 18 and 19 represent respectively normally closed and normally open contacts of a bimetal device which operates when the temperature of the thermistor bead 17 is raised.

Assuming that one of the multi-party subscribers takes up his telephone to converse, the hook switch 14 belonging to the subscriber will close its contacts and the direct current voltage from the telephone office will be applied directly to this subscriber's telephone set so that the thermistor bead 17 is heated to reduce its resistance. When the temperature of the thermistor bead 17 is raised due to its heating, the normally open contact 18 of the strip B in case of FIG. 4 is closed to establish the receiving circuit, and the normally closed contact 19 in case of FIG. 5 is opened to eliminate the short-circuit of the receiver 16 and close the receiving circuit so that the receiver 16 is brought to its operable condition. If in this case another multi-party subscriber takes up his telephone in order to use the multi-party line, the direct current voltage from the telephone exchange office is shunted by the telephone set of the first talking multi-party subscriber and a smaller voltage is applied to the telephone set of the latter multi-party subscriber so that the resistance of the thermistor connected to said telephone set can not be reduced and the temperature of the thermistor bead is not increased. Thus, in FIG. 4, the contact 18 of the bimetal device does not close its operative contact and is maintained in its open condition, while in FIG. 5 the operative contact 19 is not opened, but is closed so that the other multi-party subscriber can not intrude in the multi-party line and the first subscriber's talk can not be overheard.

What is claimed is:

1. A multi-party automatic telephone system comprising a source of electrical potential, a plurality of telephone sets each including a transmitter circuit and a receiver circuit, a connecting circuit coupling said plurality of telephone sets in parallel to said source of electrical potential, a thermal variable resistance in said connecting circuit operatively associated with each telephone set and responsive to the use of the associated set for the generation of heat, said thermal variable resistance having an inflection in its resistance characteristic, and heat responsive means operated by said thermal variable resistance for rendering effective the receivers, the use of one telephone set causing a voltage drop in the associated thermal variable resistance and thus in said connecting circuit whereby less than the full electrical potential of said source is supplied to the remaining telephone sets, thereby rendering said remaining telephone sets ineffective.

2. A system as claimed in claim 1 wherein said heat responsive means comprises a bimetallic switch connected in series with each receiver circuit and responsive to said thermal variable resistance for closing the receiver circuits when said current responsive means is subjected to full electrical potential.

3. A system as claimed in claim 1 wherein said heat responsive means comprises bimetallic switches connected in parallel to and normally short circuiting said receiver circuits and responsive to said variable resistance for opening when said thermal variable resistance is subjected to full electrical potential.

References Cited in the file of this patent

UNITED STATES PATENTS

| | | |
|---|---|---|
| 2,133,814 | Halligan | Oct. 18, 1938 |
| 2,186,242 | Halligan | Jan. 9, 1940 |